July 21, 1931.   M. C. KIRKPATRICK   1,815,847
HARNESS RETRACTOR FOR LOOMS
Filed June 23, 1930   2 Sheets-Sheet 1

MATTHEW C. KIRKPATRICK
INVENTOR

BY Victor J. Evans
ATTORNEY

WITNESS.

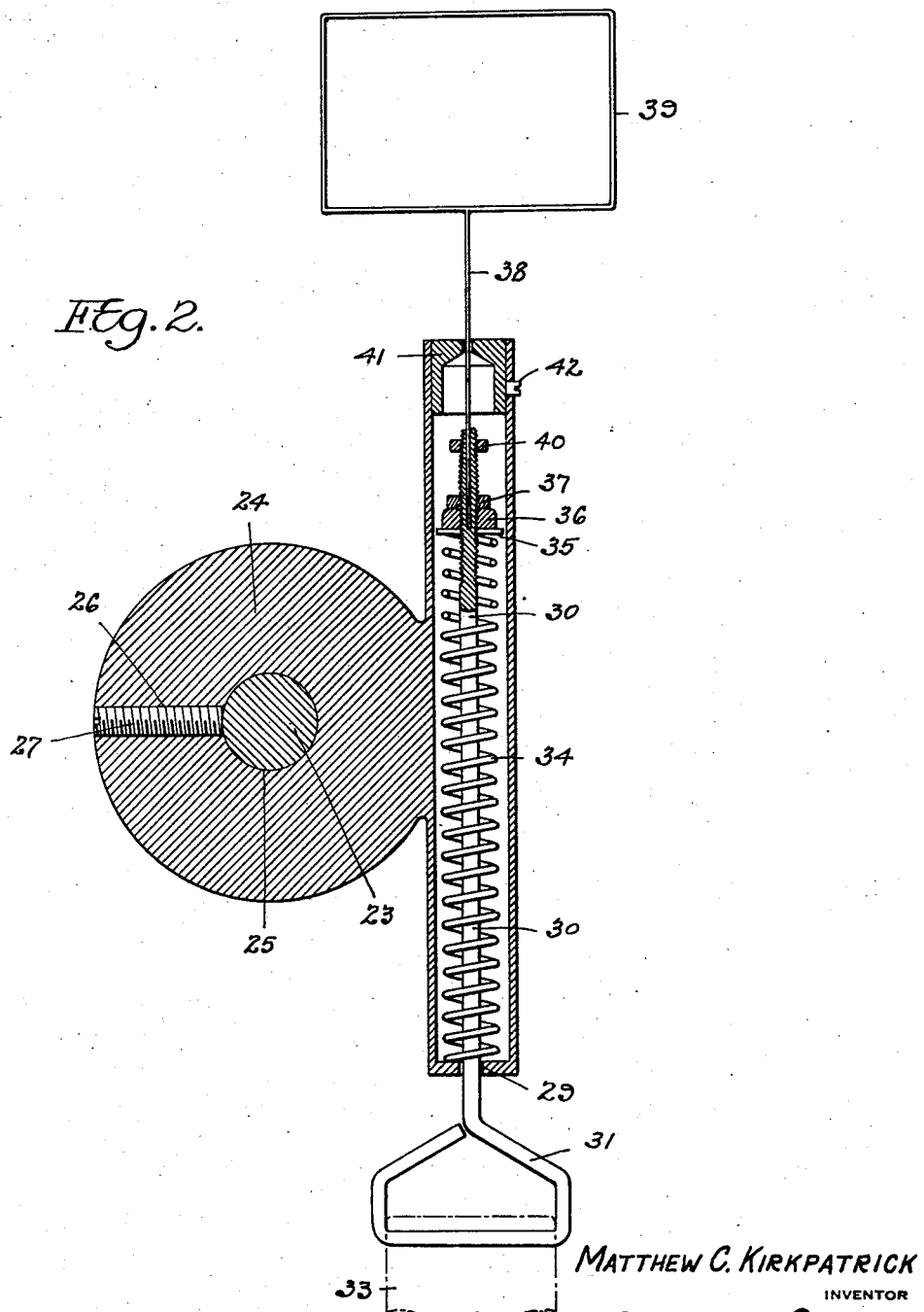

Patented July 21, 1931

1,815,847

UNITED STATES PATENT OFFICE

MATTHEW C. KIRKPATRICK, OF ROCK HILL, SOUTH CAROLINA

HARNESS RETRACTOR FOR LOOMS

Application filed June 23, 1930. Serial No. 463,231.

This invention relates to harness lifters or retractors for looms, an object being to provide simple and efficient means of this character which will greatly reduce the cost of installation and upkeep, especially when used for more than two harnesses.

Another object of the invention is the provision of a lifter which is simple and durable in construction, reliable in use, will not collect cotton or foreign matter to fall among the harness and reed and cause loom stoppage and defective cloth, and which may be attached to the studs of the loom arches of plain looms.

With the above and other objects in view, the invention further includes the following novel features and details of construction, to be hereinafter more fully described, illustrated in the accompanying drawings and pointed out in the appended claims.

Figure 2 is an enlarged vertical sectional view of the lifter.

Figure 1:
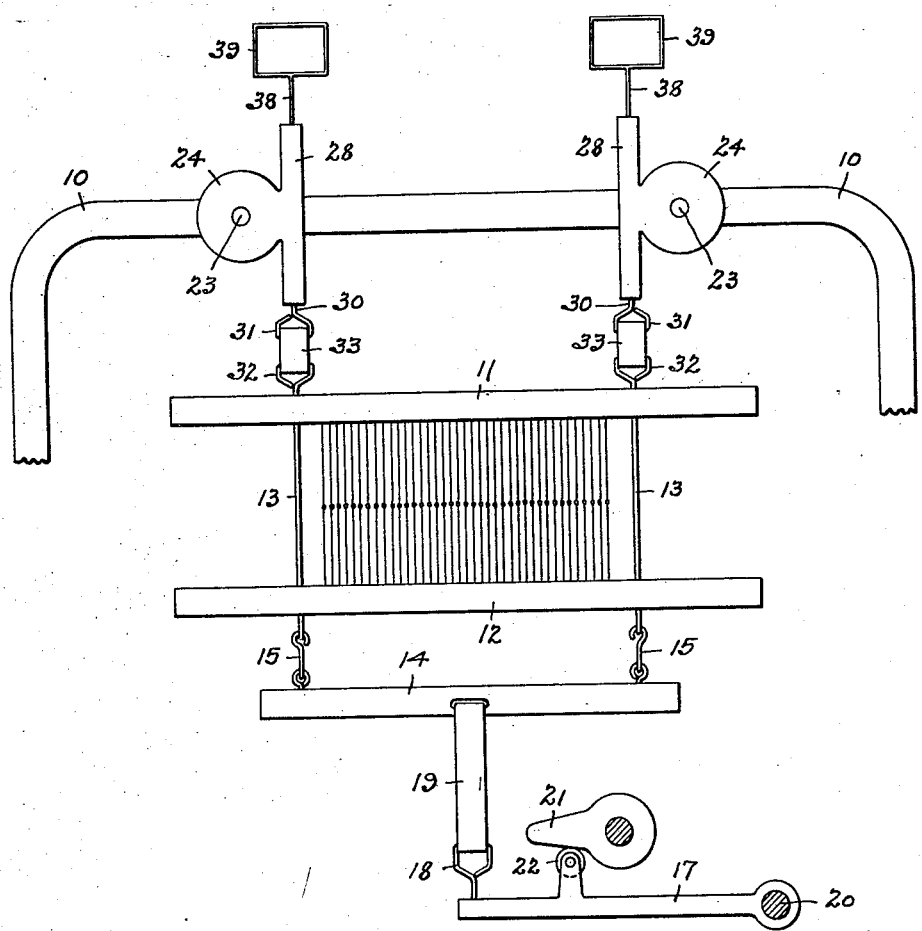
Figure 1 is a fragmentary elevation of a portion of a loom equipped with the invention.

Referring to the drawings in detail wherein like characters of reference denote corresponding parts, the reference character 10 indicates a portion of the overhead arch of the loom, 11 the top cross bar of the harness frame, 12 the bottom cross bar of said frame, while the side members which connect the top and bottom bars are indicated at 13. These side members 13 are shown in the form of rods and extend through the lower cross bar 12 and have connected thereto the jack stick 14 through the medium of hooks 15.

The reference character 17 indicates the treadle bar whose outer end is provided with a loop 18. A strap or equivalent member 19 connects the jack stick with the eye 18.

The treadle bar is pivotally mounted as shown at 20 and rotatable above this treadle bar is a harness cam 21. This cam engages a roller 22 provided on the bar 21 and acts to force the treadle bar downward. This downward movement carries with it the harness frame which is moved in an opposite direction by means of lifters constituting the present invention. It is of course understood that the harness frames and their actuating elements are duplicated, but for the sake of clarity, only one harness frame is shown.

In plain looms, the arch 10 is provided with studs 23 which carry the lifter mechanisms. These studs are utilized in the present invention and for this purpose the invention includes a pair of harness lifters, each of which includes a disk 24 having an opening 25 therein. This disk is provided with a radially disposed threaded socket 26 within which is positioned a set screw 27, and the inner end of this screw engages the stud 23 so as to securely hold the lifter in place.

The disk 24 carries a tubular member 28 whose lower closed end is provided with an opening 29 for the passage of a rod 30. The lower end of this rod is provided with an eye 31 and this eye is connected to an eye 32 carried at the upper end of each of the rods 13, by means of a strap or equivalent connecting member 33.

The rod 30 is surrounded by a coiled spring 34 and one end of this spring bears against the lower end of the tubular member 28, while the upper end of this spring bears against a washer 35. The upper end of the rod 30 is threaded and is engaged by an adjusting nut 36 and a lock 37, so that the tension of the spring 34 may be adjusted.

The upper end of the rod 30 is lonigtudinally split to receive the lower end of the shank 38 of a card holder 39. This end of the rod 30 is tapered and the shank is clamped within the split end of the rod by means of a clamping nut 40. The shank 38 extends through an opening provided in a closure member 41 at the upper end of the tubular member 28, and this closure member is removably held in place by means of a set screw 42.

As one of these lifters is connected to each end of each of the harness frames, when the loom is in operation, these frames will move downward through the operation of the cams 21, downward movement being yieldingly resisted by the springs 34. As the cam continues to rotate, the springs will lift the frames, as is well known in looms of this character.

Cards may be placed in the card holders to indicate different classes of goods, or may have any other indicia marked or imprinted thereon. In addition, loom stoppage from various causes may be more easily counted through the use of these cards.

It will be apparent from the foregoing description that the present invention provides an exceedingly simple and inexpensive harness frame lifter for looms which may be readily installed through the use of the lifter and studs found upon plain looms.

The invention is susceptible of various changes in its form, proportions and minor details of construction and the right is herein reserved to make such changes as properly fall within the scope of the appended claims.

Having described the invention what is claimed is:—

1. In a harness lifter for looms, spaced tubular members, means to secure said members to the arch of the loom, a rod movable longitudinally within each tubular member, means to attach the rods to the harness frame, and springs located within the tubular members around the rods to yieldingly resist downward movement of said frame and return the latter to raised position.

2. In a harness lifter for looms, spaced tubular members, brackets extending from said members and having openings therein to receive studs carried by the arch of the loom, a rod movable longitudinally within each tubular member, means to attach the rods to the harness frame, and springs located within the tubular members around the rods to yieldingly resist downward movement of said frame and return the latter to raised position.

3. In a harness lifter for looms, spaced tubular members, means to secure said members to the arch of the loom, a rod movable longitudinally within each tubular member, means to attach the rods to the harness frame, springs located within the tubular members around the rods to yieldingly resist downward movement of said frame and return the latter to raised position, and a card holder extending from the top of the tubular member and having its inner end secured to the rod.

4. In a harness lifter for looms, spaced tubular members, means to secure said members to the arch of the loom, a rod movable within each tubular member and having its inner end split, a card holder including a staff extending from the top of the tubular member and having its inner end inserted within the split end of the rod, means to attach the rods to the harness frame, and springs located within the tubular members around the rods to yieldingly resist downward movement of said frame and return the latter to raised position.

In testimony whereof I affix my signature.

MATTHEW C. KIRKPATRICK.